United States Patent
Padilla et al.

(10) Patent No.: US 10,311,265 B2
(45) Date of Patent: Jun. 4, 2019

(54) UNIVERSAL MOUNTING RING

(71) Applicant: ASSA ABLOY AB, Stockholm (SE)

(72) Inventors: Toby Mark Padilla, Lakewood, CO (US); Randall Dennis Bousfield, Arvada, CO (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/201,020

(22) Filed: Jul. 1, 2016

(65) Prior Publication Data

US 2017/0256927 A1 Sep. 7, 2017

Related U.S. Application Data

(63) Continuation-in-part of application No. 29/557,095, filed on Mar. 4, 2016, now Pat. No. Des. 792,405, and a continuation-in-part of application No. 29/557,099, filed on Mar. 4, 2016, now Pat. No. Des. 786,223.

(51) Int. Cl.
| | |
|---|---|
| *G06K 7/10* | (2006.01) |
| *H02G 3/14* | (2006.01) |
| *H02G 3/12* | (2006.01) |

(52) U.S. Cl.
CPC ..... *G06K 7/10336* (2013.01); *G06K 7/10009* (2013.01); *H02G 3/14* (2013.01); *H02G 3/123* (2013.01)

(58) Field of Classification Search
CPC ....... H02G 3/14; H02G 3/083; G06K 7/10336
See application file for complete search history.

(56) References Cited

U.S. PATENT DOCUMENTS

| | | | | | |
|---|---|---|---|---|---|
| 4,220,808 | A | * | 9/1980 | Fujita | H02B 1/048 174/490 |
| 4,267,962 | A | * | 5/1981 | Domkowski | G07F 9/06 232/15 |
| 4,715,732 | A | * | 12/1987 | Sanders | B25F 5/00 310/90 |

(Continued)

FOREIGN PATENT DOCUMENTS

| | | |
|---|---|---|
| DE | 4000562 A1 | 7/1990 |
| DE | 29911298 | 11/2000 |

(Continued)

OTHER PUBLICATIONS

U.S. Appl. No. 29/557,095, filed Mar. 4, 2016, Bousfield.

(Continued)

*Primary Examiner* — Binh B Tran
*Assistant Examiner* — Douglas R Burtner
(74) *Attorney, Agent, or Firm* — Schwegman Lundberg & Woessner, P.A.

(57) ABSTRACT

A universal mounting ring has an arcuate or curved upper portion and a plurality of downwardly depending tabs. The universal mounting ring is configured to interface with an electrical enclosure, such as conventional electrical junction boxes to permit a radio frequency identification (RFID) reader to be secured within the enclosure and mate with a wide variety of enclosure cover assemblies manufactured by third parties. The downwardly depending mounting tabs are provided with multiple mounting positions such that the reader may be securely mounted at a plurality of positions relative to a cover assembly.

9 Claims, 19 Drawing Sheets

(56) References Cited

U.S. PATENT DOCUMENTS

| | | | |
|---|---|---|---|
| 5,144,777 A | 9/1992 | Fishel et al. | |
| D351,152 S | 10/1994 | Liu | |
| RE35,735 E | 2/1998 | Douty et al. | |
| 6,543,689 B2 | 4/2003 | Sabella | |
| D480,725 S | 10/2003 | Funato | |
| 7,004,669 B1* | 2/2006 | Vaughn | F16B 7/0413 |
| | | | 403/291 |
| D585,056 S | 1/2009 | Ekelund | |
| 7,529,571 B2* | 5/2009 | Byun | H04M 1/0237 |
| | | | 16/334 |
| D647,106 S | 10/2011 | Akana et al. | |
| D653,664 S | 2/2012 | Turnbull et al. | |
| D659,163 S | 5/2012 | Akana et al. | |
| D660,834 S | 5/2012 | Akana et al. | |
| D671,118 S | 11/2012 | Wesolek | |
| D701,860 S | 4/2014 | Daniel | |
| D705,201 S | 5/2014 | Isaacs et al. | |
| D730,355 S | 5/2015 | Daniel | |
| D730,899 S | 6/2015 | Daniel | |
| D732,040 S | 6/2015 | Chuang et al. | |
| 9,052,101 B1* | 6/2015 | Kathawate | F21V 21/046 |
| D735,175 S | 7/2015 | Liu et al. | |
| D735,176 S | 7/2015 | Liu et al. | |
| D736,207 S | 8/2015 | Bousfield et al. | |
| D766,901 S | 9/2016 | Nguyen | |
| D774,510 S | 12/2016 | Rotsaert | |
| 9,831,648 B1* | 11/2017 | Gretz | H02G 3/081 |
| 10,145,550 B2* | 12/2018 | Johnson | F21V 25/125 |
| 2004/0045960 A1* | 3/2004 | Rose | H02G 3/08 |
| | | | 220/3.9 |
| 2007/0181328 A1 | 8/2007 | Dinh | |
| 2008/0041625 A1* | 2/2008 | Cheong | H01L 33/60 |
| | | | 174/521 |
| 2008/0060905 A1* | 3/2008 | Snadden | F16B 21/20 |
| | | | 192/213.2 |
| 2009/0205864 A1 | 8/2009 | McCarthy | |
| 2011/0174943 A1* | 7/2011 | Smith | B60R 25/00 |
| | | | 248/220.21 |
| 2012/0187131 A1* | 7/2012 | Claucherty | B60K 15/03 |
| | | | 220/562 |
| 2013/0036703 A1* | 2/2013 | Gagne | H02G 3/36 |
| | | | 52/656.2 |
| 2013/0286669 A1* | 10/2013 | Moser | F21V 19/001 |
| | | | 362/382 |
| 2014/0027142 A1* | 1/2014 | Cousineau | H02G 3/083 |
| | | | 174/51 |
| 2014/0083221 A1* | 3/2014 | Hein | F16H 55/12 |
| | | | 74/421 A |
| 2014/0131088 A1* | 5/2014 | Drane | H02G 3/185 |
| | | | 174/483 |
| 2015/0130447 A1* | 5/2015 | Storrie | G01D 5/145 |
| | | | 324/207.24 |
| 2015/0146411 A1* | 5/2015 | Holland | H01R 13/44 |
| | | | 362/95 |
| 2016/0209018 A1* | 7/2016 | Johnson | F21V 25/125 |
| 2016/0363297 A1* | 12/2016 | Boulanger | F21V 17/005 |
| 2017/0234568 A1* | 8/2017 | Read | F24F 11/89 |
| | | | 248/205.4 |
| 2017/0244230 A1* | 8/2017 | Galasso | H02G 3/085 |

FOREIGN PATENT DOCUMENTS

| | | |
|---|---|---|
| DE | 10227398 | 1/2004 |
| DE | 202004015082 | 11/2004 |
| DE | 202012101901 | 6/2012 |
| EP | 1635434 | 3/2006 |
| EP | 2477290 | 7/2012 |
| EP | 2802050 | 11/2014 |

OTHER PUBLICATIONS

U.S. Appl. No. 29/557,099, filed Mar. 4, 2016, Bousfield.
European Extended Search Report for European Patent Application No. 14159489.5, dated Mar. 24, 2015, 4 pages.
European Written Opinion for European Patent Application No. 14159489.5, dated Mar. 24, 2015, 2 pages.
Official Action for Chinese Patent Application No. 201630462047.X, dated Sep. 5, 2016, 1 page.
Official Action for Chinese Patent Application No. 201630462047.X, dated Mar. 2, 2017, 1 page.
Examination Report for India Design Application No. 286620, dated Oct. 31, 2016, 20 pages.
Notice of Allowance (with English translation) for Chinese Patent Applicatio No. 201630462037.6, dated Jan. 12, 2017, 5 pages.
Notice of Allowance for U.S. Appl. No. 29/557,095, dated Mar. 13, 2017, 7 pages.
Notice of Allowance for U.S. Appl. No. 29/557,099, dated Jan. 9, 2017, 6 pages.
Notice of Allowance with English Translation for China Patent Application No. 201630462047.X, dated Jun. 9, 2017 5 pages.
Extended Search Report for European Patent Application No. 17179055.3, dated Nov. 27, 2017 9 pages.
Official Action for European Patent Application No. 14159489.5, dated Sep. 11, 2017 4 pages.
Official Action for European Patent Application No. 17179055.3, dated Jul. 31, 2018 8 pages.
"European Application Serial No. 17179055.3, Communication Pursuant to Article 94(3) EPC dated Jan. 23, 2019", 7 pgs.

* cited by examiner

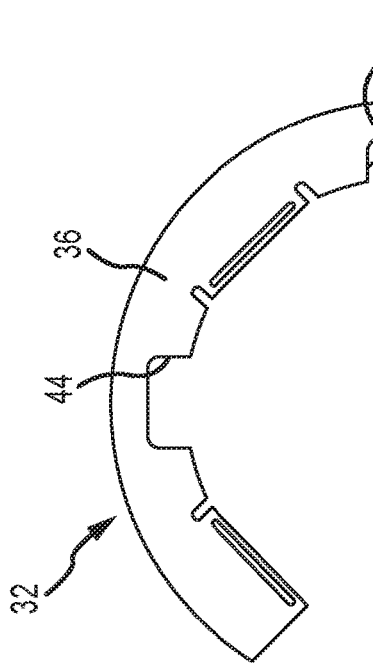
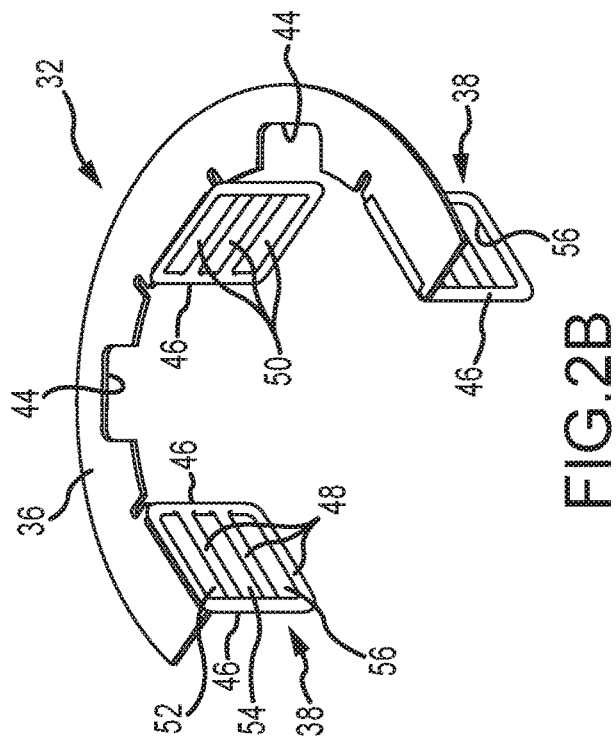
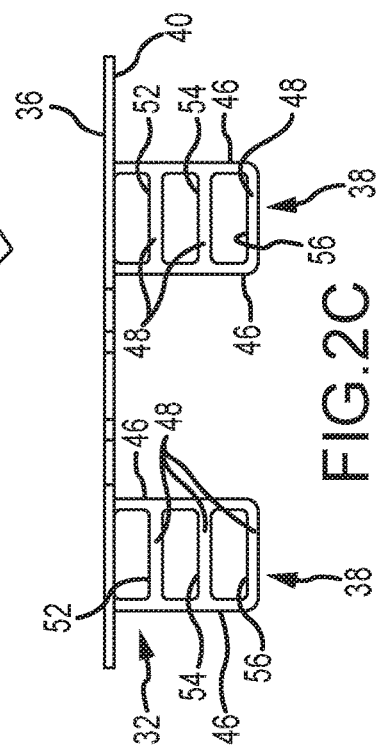

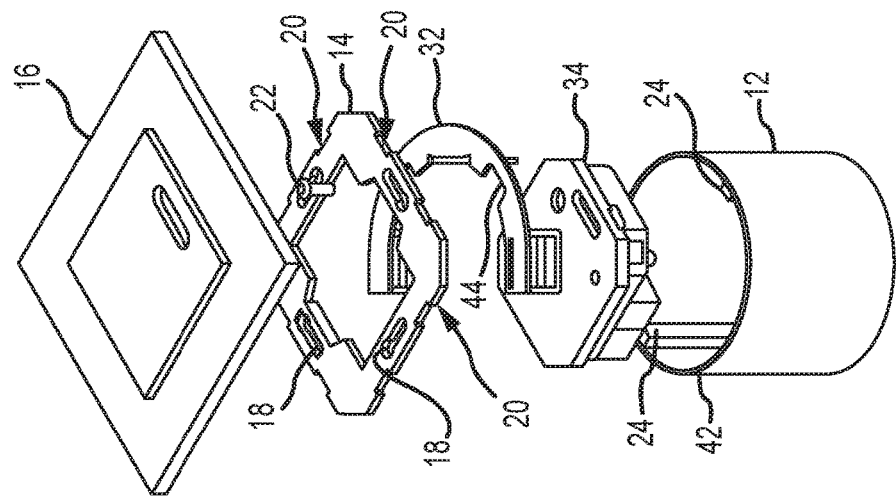
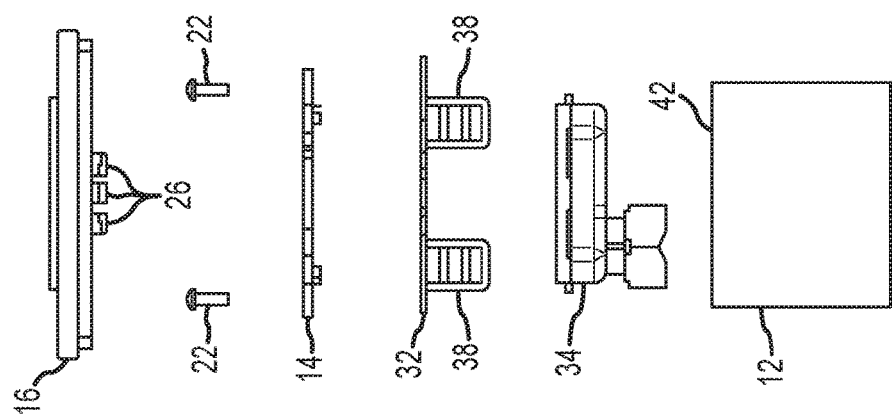
FIG. 3B
FIG. 3A

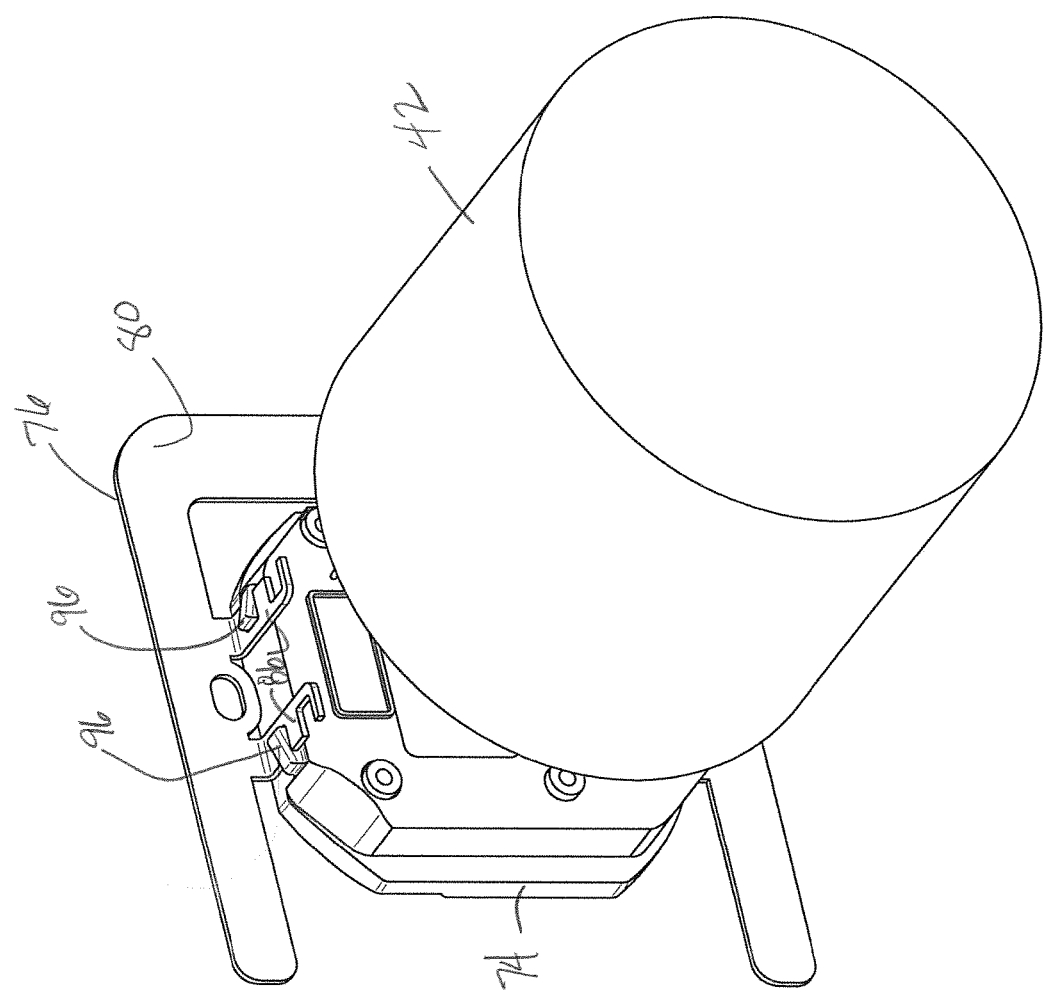

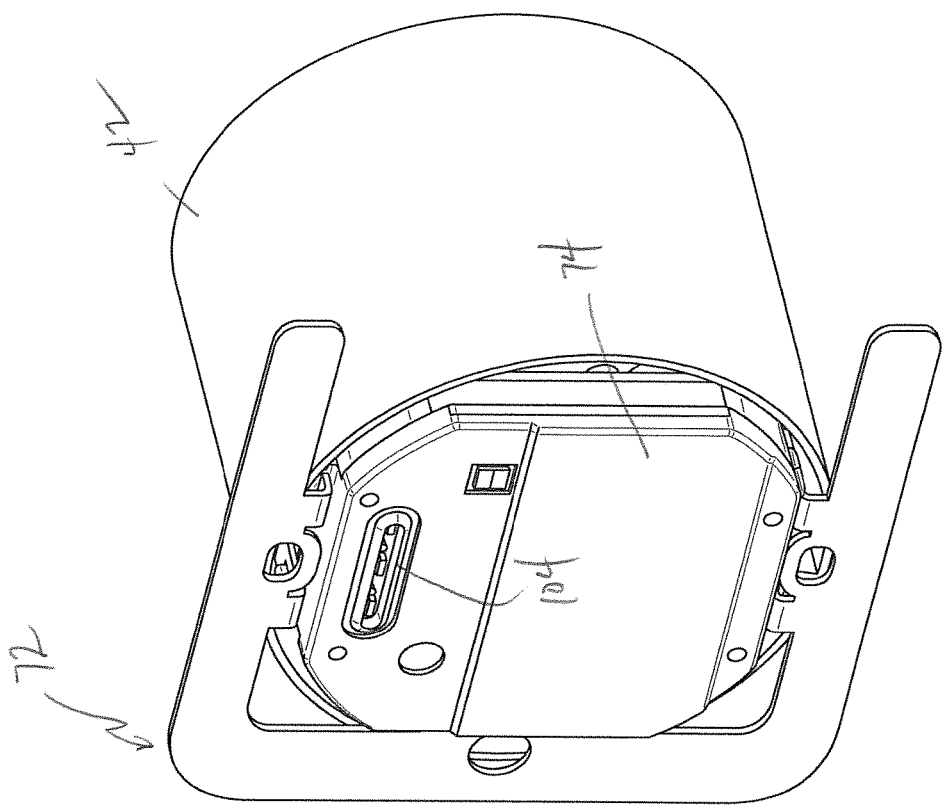
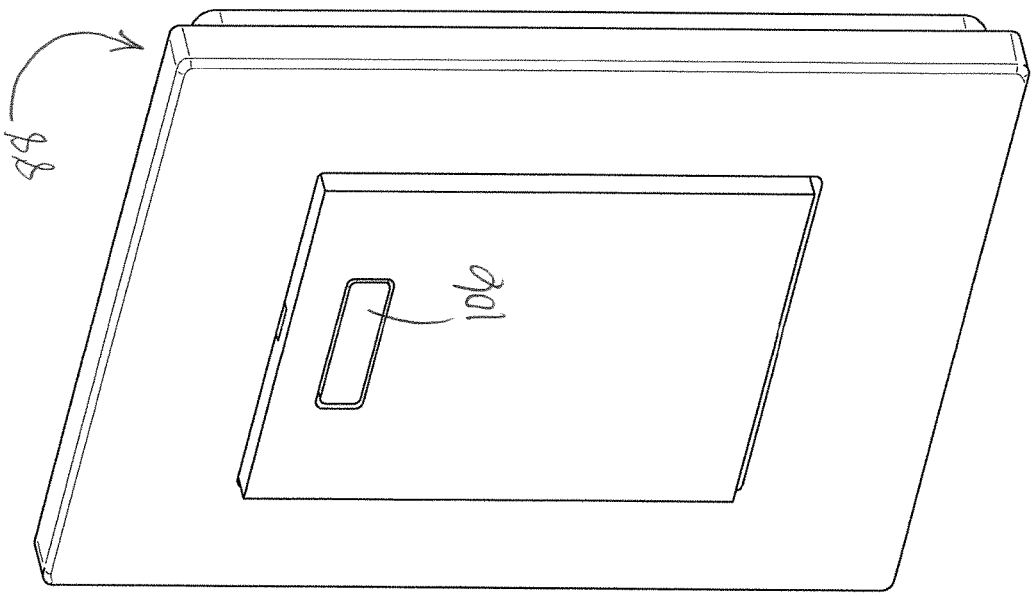
FIG.11

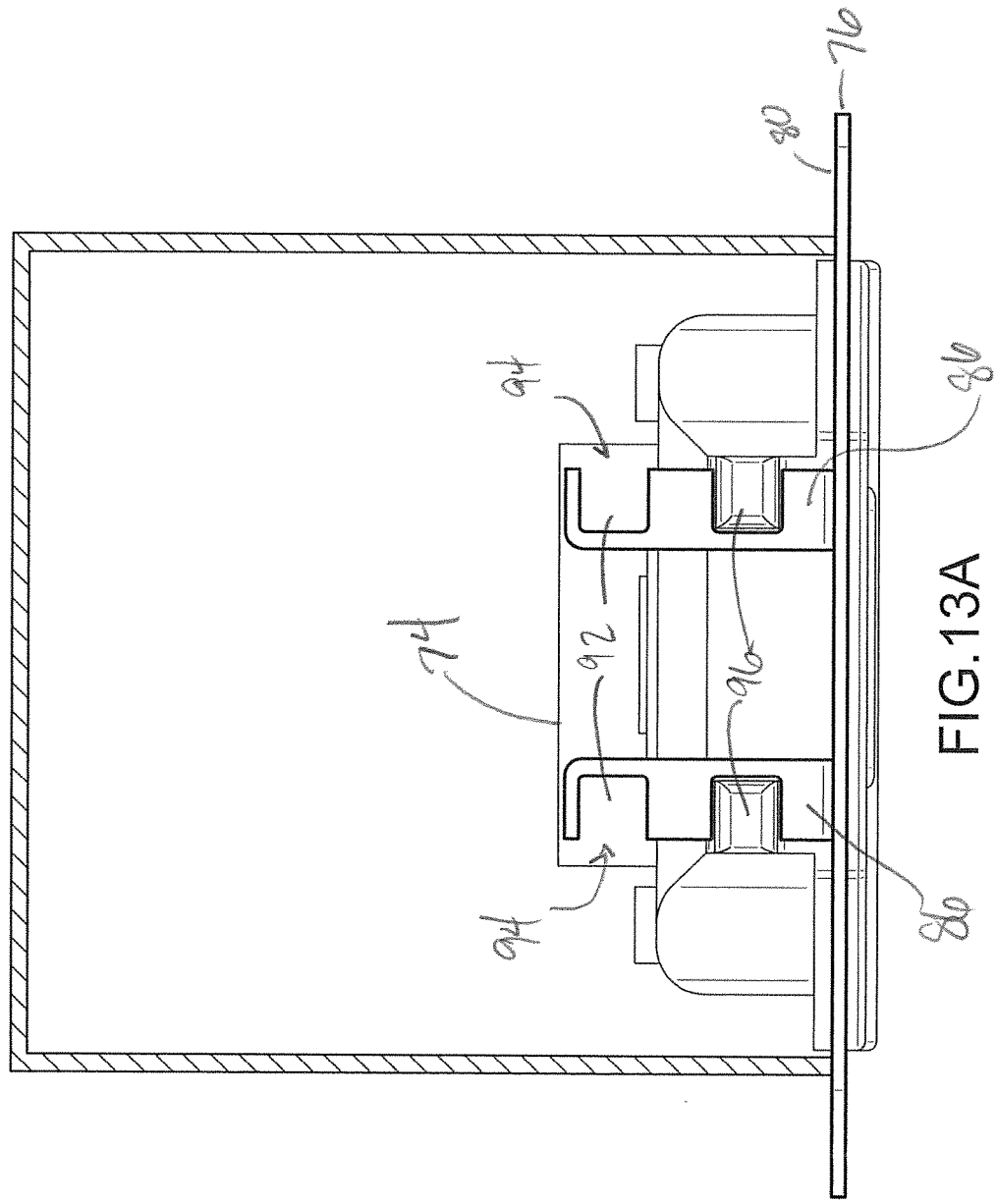

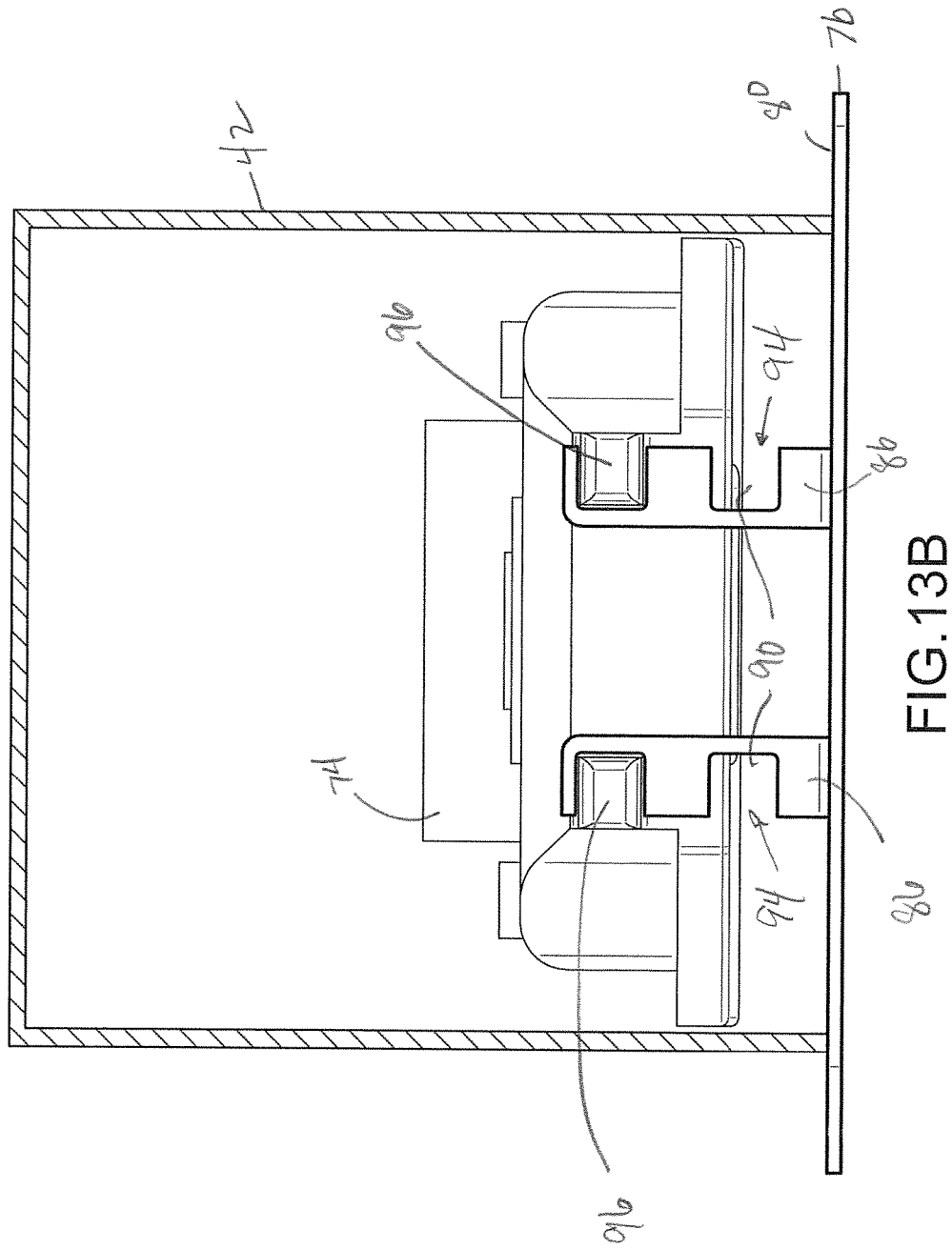

UNIVERSAL MOUNTING RING

RELATED APPLICATIONS

This application is a continuation-in-part of co-pending U.S. patent application Ser. No. 29/557,095 entitled "Reader Module" having a filing date of Mar. 4, 2016 and U.S. patent application Ser. No. 29/557,099 entitled "Reader Module Bracket" having a filing date of Mar. 4, 2016, the entirety of each of which is incorporated herein by reference.

FIELD OF THE INVENTION

The present application relates to a universal adapter to permit mounting of an electronic device, such as a contact or contactless reader, miniature controller, door interface module or other electronic device in an electrical enclosure, such as a conventional electrical junction box. The adapter further allows variable positioning of the electronic device or reader within the enclosure and accommodates a wide variety of cover plates to enhance aesthetic finishes.

BACKGROUND OF THE INVENTION

Contactless radio frequency identification (RFID) systems typically include at least one reader and a plurality of transponders, which are commonly termed credentials, cards, tags or the like. The transponder may be an active or passive radio frequency communication device which is directly attached to or embedded in an article to be identified or otherwise characterized by the reader. Alternatively, the transponder may be embedded in a portable substrate, such as a card or tag, carried by a person to be identified or otherwise characterized by the reader.

Communication between the reader and transponder is enabled by cooperative resident circuits which are provided in each reader and transponder. The resident circuit of a reader typically includes an inductor and a capacitor. The capacitor is coupled in series between the inductor and a signal driver. The inductor is usually in the form of an antenna coil which is capable of magnetically coupling to an inductor in the resonant circuit of a compatible transponder through mutual inductance. The communication is initiated when a transponder is proximately positioned relative to the reader. The reader has a power supply which conveys a current to the reader resident circuit, causing the reader antenna to produce an excitation signal in the form of an electromagnetic field. The excitation signal couples to the antenna of the proximately positioned transponder through mutual inductance and the excitation signal powers and clocks the transponder circuitry initiating operation of the transponder. These components are typically mounted on a board, such as a printed circuit board.

The transponder operation comprises the generation of a response signal at a specified frequency and transmission of the resulting transponder's response signal back to the reader. In particular, the transponder resonant circuit receives a current and responds to the excitation signal which causes the transponder antenna to produce a response signal in the form of an electromagnetic field. The response signal couples to the reader antenna through mutual inductance in substantially the same manner as described above with respect to coupling of the excitation signal to the transponder antenna.

An important operating parameter of the reader is the range of the reader when communicating with a transponder. The range of a reader is inter alia strongly affected by the strength of the electromagnetic field generated by the reader resonant circuit. In order to generate a field strength which provides the reader with adequate range, the designer of the reader must properly specify a resonant circuit that is appropriately tuned to a predetermined frequency for the desired application of the RFID system. The range of the reader is often altered by characteristics of the operating environment in which the reader resides. In a typical case where the reader is mounted in a fixed location on a support structure, the range of the reader is susceptible to the materials of the mounting location and other objects within the operating environment. For example, if the mounting location of a reader is in an operating environment which includes nearby metal, the metal can de-tune the resonant circuit of the reader from the predetermined frequency and drastically reduce the range of the reader. For these reasons, it is often desirable to pot a reader in a plastic housing with an epoxy and mount the reader to a wall, away from metal objects. While this approach is desirable from a functional standpoint, it is often undesirable from an aesthetic standpoint as the housing provides an unacceptable finished look. For example, the reader housing protrudes from the surface of a wall an unacceptable distance and/or utilizes a cover plate designed solely for the reader but which may not aesthetically match the cover plates used throughout the building and particularly nearby space. Additionally, because the reader is potted in the plastic housing, the housing cannot be changed.

SUMMARY OF THE INVENTION

In accordance with the preferred embodiment of the present invention, a universal mounting ring is provided for securing an electronic device, for example, a radio frequency identification (RFID) reader, within an electrical enclosure. It should be appreciated that the universal mounting ring may also secure other types of readers, including contact and contactless readers, and other types of electronic devices, such as a miniature controller or door interface module. One example of such an enclosure is a conventional electrical junction box. The universal mounting ring provides multiple mounting positions for the electronic device relative to a cover assembly which is utilized to provide an aesthetic cover for the content of the enclosure.

In one embodiment the universal mounting ring comprises a generally planar arcuate plate with three downwardly depending mounting tabs. The radius of curvature for the arcuate plate is the same or substantially similar to the radius for a conventional cylindrical junction box. The arcuate plate includes multiple cutouts to allow access to screw bores formed in the side walls of the enclosure or junction box. In this manner, a conventional mounting bracket may be secured to the junction box by way of screws that engage the mounting bracket and pass through the cutouts in the arcuate plate and are secured within the screw bores formed in the enclosure or junction box. Other aspects of the present disclosure include mounting schemes such as snaps, adhesives, clips, pins, hook and loop fasteners and others as an alternative to or for use in combination with traditional mounting mechanisms such as screws. According to such embodiments, the arcuate plate may be altered as needed to accommodate such alternative mounting schemes. Downwardly depending mounting tabs provide three mounting positions for a reader, although it should be appreciated that fewer or more mounting positions may be provided. Because the arcuate plate fits between the upper edge of an enclosure or junction box and a conventional mounting bracket, any cover assembly that interfaces with a conventional mounting bracket may be utilized to cover the reader as positioned on or within the enclosure. This provides significant aesthetic functionality by permitting the cover assembly for the reader to match cover assemblies for other enclosures or junction boxes in the same vicinity and throughout a building. It should be appreciated that the universal mounting ring would also work with custom mounting brackets in addition to conventional mounting brackets. Because the universal mounting ring permits access to the screw bores in a conventional junction box, the universal mounting ring will work with virtually any mounting bracket and cover plate designed to interface with the screw bores in a junction box or other type of electrical enclosure. According to aspects of the present disclosure, the mounting plate may also be adapted to connect with the cover assembly in non-traditional ways, including but not limited to glues, adhesives, snaps, hook and loop style fasteners, clips, pins, etc.

The universal mounting ring also permits the reader to be positioned within the enclosure or junction box at different positions spaced from the cover assembly. This is important for multiple reasons. For example, cover assemblies for electrical enclosures and junction boxes come in a wide variety of configurations and the inner surface of the cover assemblies may vary in structure and structural relative thickness. Accordingly, different thicknesses and structural configurations can be accomplished by adjusting the position of the reader relative to the inner surface of the cover assembly. In addition, performance of the device, for example read range for a reader, may also be adjusted by positioning the electronic device at different positions within the enclosure. Depending upon the particular circumstances for the reader installation, and the type of reader being used, including its performance characteristics, it may be desirable to adjust the read range by changing the position of the reader among the available mounting positions. Moreover, and also with respect to read range and performance, when a metal mounting bracket is used, in a preferred embodiment, the mounting bracket should be cut to form a gap or slot across the body of the mounting bracket such that the mounting bracket does not form a continuous loop of metal. By doing so, the read range of the reader will be improved. Further still, adjusting the position of the electronic device within the enclosure also permits adding additional components, for example, a liquid crystal display ("LCD") or other display, within the enclosure. As will be appreciated by those of skill in the art, adding a display to the functionality of the electronic device can enhance the functionality of the electronic device.

In an alternative embodiment, the mounting ring has a different configuration, for example, a "C-shape" or "U-shape." In addition, the downwardly depending mounting tabs may have a different configuration. Importantly, consistent with prior embodiments, the mounting tabs include multiple spaced mounting positions for an electronic module or device and permit the electronic module to be positioned at different spaced locations relative to the cover assembly, including a position fully or partially recessed within a wall thereby allowing the relative thickness or profile of the cover assembly to vary for either or both functional and/or aesthetic purposes and allowing the position of the electronic module to vary for functional purposes.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. For example, the configuration of the mounting ring and the cover assembly may vary from that depicted in the drawings without departing from the scope of the invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 2A is a top plan view of one embodiment of a universal mounting ring.

FIG. 2B is a perspective view of the universal ring mount shown in FIG. 2A.

FIG. 2C is a front elevation view of the universal ring mount shown in FIG. 2A.

FIG. 3A is an exploded front plan view of a conventional electrical junction box, an electronic device, such as an RFID reader, a universal mounting ring as shown in FIG. 2A, a mounting bracket and a cover plate.

FIG. 3B is a perspective view of the embodiment of FIG. 3A.

FIG. 9B is an exploded rear perspective view of the components shown in FIG. 9A.

FIG. 11 is an exploded front perspective view of the subassembly shown in FIG. 10, with a cover plate.

FIG. 13A is a top plan view of the embodiment shown in FIG. 10, with the electrical junction box shown in cross-section, and the electronic module located in a first position relative to the mounting bracket.

FIG. 13B is a top plan view of the embodiment shown in FIG. 10, with the electrical junction box shown in cross-section, and the electronic module located in a second position relative to the mounting bracket.

It should be understood that the illustrated embodiments are depicted with a conventional cylindrical electrical junction box. It should be appreciated that the invention is not limited to such junction boxes but is adapted to work with almost any electrical enclosure, including rectilinear enclosures. It should further be appreciated that an RFID reader is illustrated but that the embodiments of the present invention may be utilized with a variety of electronic devices other than readers, including but not limited to miniature controllers or door interface modules. It should also be appreciated that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

For simplicity in understanding, the present disclosure is described and illustrated with respect to use with an RFID reader. It should be appreciated that the universal mounting ring may be used with all types of access control readers, including both contactless and contact readers, as well as other types of electronic devices, including miniature controllers and door interface modules.

Figure 1B:
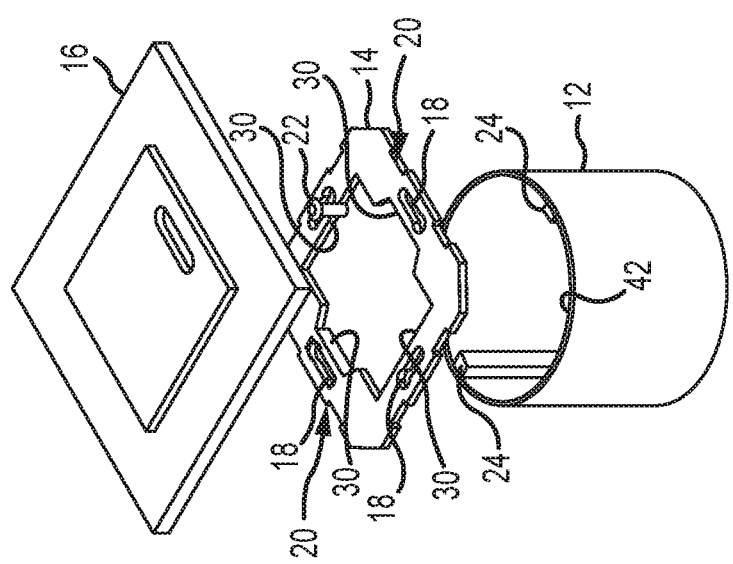
FIG. 1B is an exploded perspective view of the components shown in FIG. 1A.
Figure 1A:
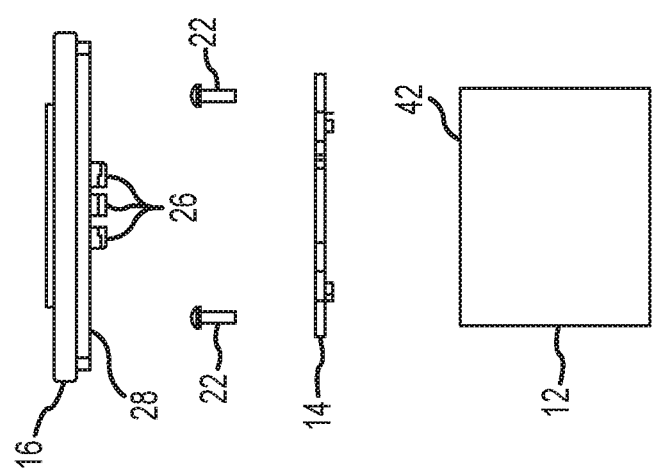
FIG. 1A is an exploded front plan view of a conventional electrical junction box, mounting bracket and cover plate assembly.

One embodiment of a prior art electrical junction box 12, mounting bracket 14 and cover assembly 16 is shown in FIGS. 1A and 1B. The junction box 12 is designed to hold an electronic component, such as a light switch. The cover assembly 16 provides an aesthetic closure and finish that covers the contents of the junction box 12. The mounting bracket 14 is attached to the junction box 12 and, in turn, the cover assembly 16 is affixed to the mounting bracket 14. More specifically, a slot 18 is formed in each side or leg 20 of the mounting bracket 14 through which screws 22 extend and threadably engage screw bores 24 formed along the inside surface of the junction box 12. As shown, two screw bores 24 are positioned at opposite sides of the junction box 12. Typically, the cover assembly 16 is designed to engage the mounting bracket 14 with a friction fit. As seen in FIG. 1A, downwardly depending tabs 26 extend from the inner surface 28 of the cover assembly 16 to engage one or more edges 30 of the mounting bracket. Different methods and structures for attaching a cover assembly 16 to a mounting bracket 14 are known to those of skill in the art. Such different structures and methods vary and in some structures the connecting components extend different depths into the interior of the junction box 12 from the inner surface 28 of the cover assembly 16.

Turning to FIGS. 2A-2C, one embodiment of a universal mounting ring 32 is illustrated. The universal mounting ring 32 is designed to secure an electronic device, for example an RFID reader 34, within a conventional electrical junction box 12 and also interface with a conventional mounting bracket 14 to secure a cover assembly 16 for the reader 34 over the electrical junction box 12. As illustrated, the universal mounting ring 32 comprises a partial arcuate plate 36 and a plurality of mounting tabs 38 extending generally perpendicular to the plane of the arcuate plate 36. In one embodiment, the radius of the curvature of the arcuate plate 36 is the same as or nearly similar to that of the cylindrical junction box 12 such that the lower surface 40 of the arcuate plate 36 may rest upon the upper edge 42 of such a junction box. One or more cutouts 44 are formed in the arcuate plate 36 to provide access to screw bores 24 provided on the inside wall of a junction box 12. The orientation or placement of multiple cutouts is arranged on the arcuate plate 36 to facilitate use of the arcuate plate with junction boxes having either a circular or rectangular opening.

Figure 6:
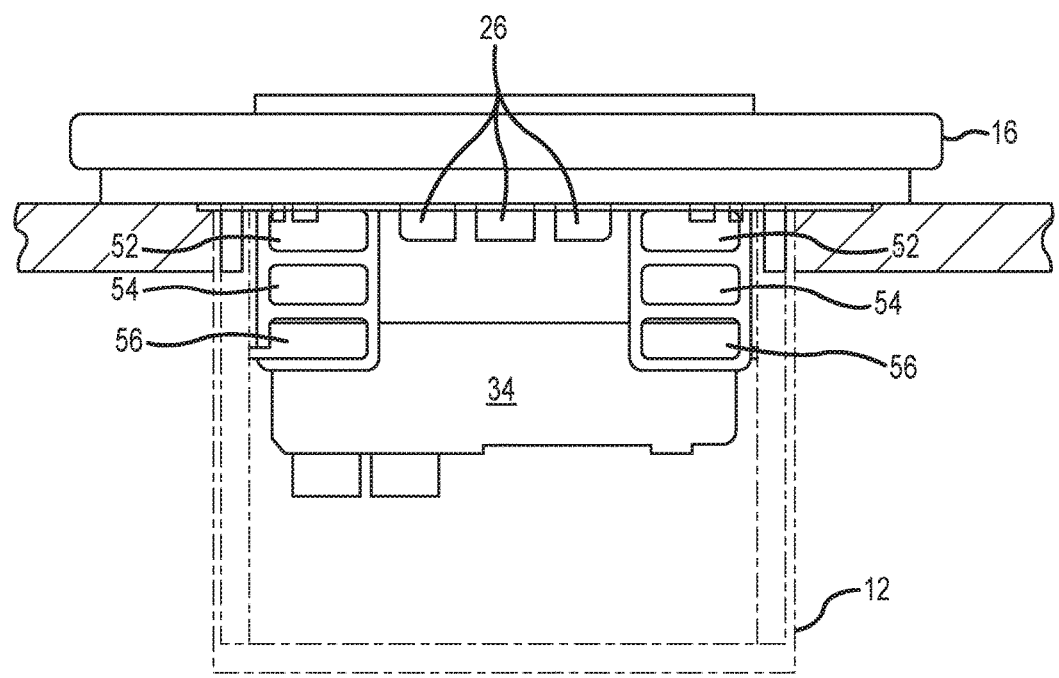
FIG. 6 is a front elevation view of an assembled junction box, reader, universal mounting ring, mounting bracket and cover assembly, with the junction box shown in phantom, and further showing the reader at a position farthest removed from the cover assembly.
Figure 7:
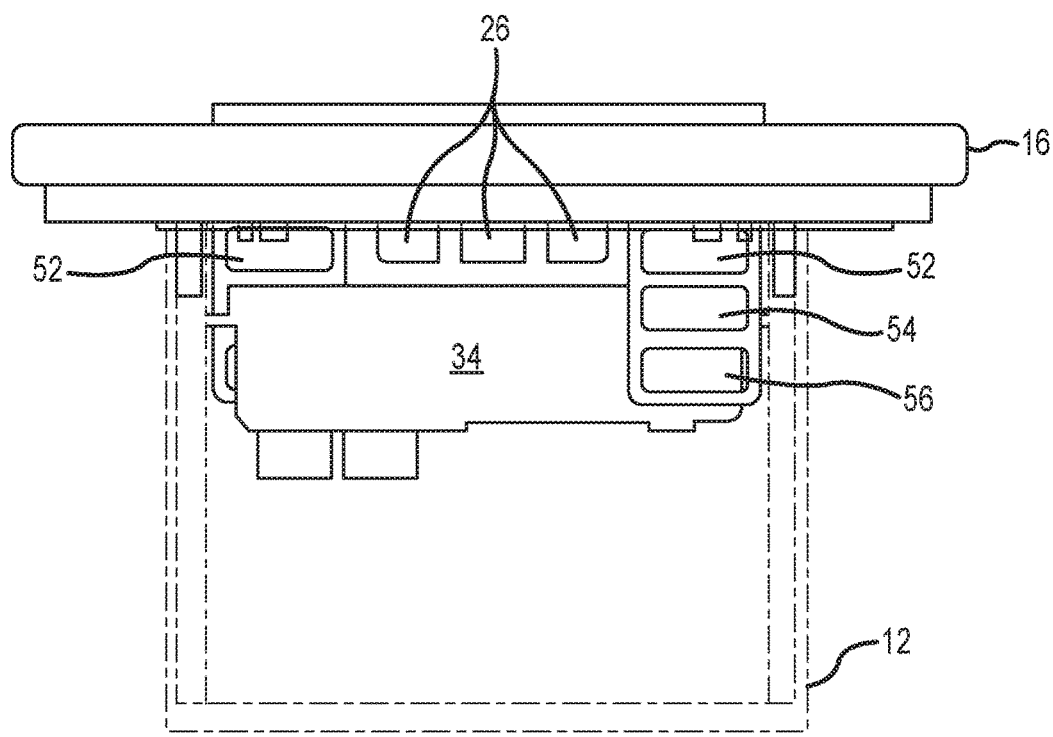
FIG. 7 is a front elevation view of the embodiment of FIG. 6, and further showing the reader at a position closest to the cover assembly.

In one embodiment, the downwardly depending mounting tabs 38 are generally ladder-shaped. For example, as shown in FIGS. 2B and 2C, each tab 38 comprises two legs 46 extending from the arcuate plate 36 and oriented generally parallel to each other. Multiple cross members 48 extend between the two legs 46 to define notches 50 which are adapted to receive a complementary portion of a reader 34. Each cross-member 48 provides a separate mounting position and, in a preferred embodiment, multiple mounting positions are provided on each tab 38. A first mounting position 52 is generally proximate the underneath surface of the arcuate plate 36. As illustrated, each successive mounting position 54, 56 repositions the reader 34 a farther distance from the arcuate plate 36. Positioning the reader 34 relative to the arcuate plate 36 in the various mounting positions can alter the read range of the reader 34. Altering the read range of the reader 34 may be necessary for security reasons or for other reasons known to persons of ordinary skill in the art. In addition, the ability to position the reader at various depths or locations within the junction box allows greater flexibility in the selection and use of different cover assemblies 16. As previously noted, cover assemblies 16 are constructed differently and have different assembly structures that extend different depths or distances into the junction box 12. The ability to alter and adjust the position of the reader 34 relative to the cover assembly 16 has the added benefit of allowing use of a greater number of variety of cover assemblies 16 from different manufactures or vendors. FIG. 6 shows a reader 34 mounted farthest from the cover assembly 16. FIG. 7 shows a reader 34 mounted closest to the cover assembly 16.

It should be appreciated that more than three mounting positions may be included on each mounting tab 38. Similarly, three mounting tabs 38 are not required. Rather, typically at least two tabs 38 would be required without additional structure for securing the reader relative to the arcuate plate. It is contemplated that a single mounting tab 38 could be utilized in combination with a positive latching or securing mechanism. In addition, the mounting tabs 38 do not need to be "ladder" shaped, but may be any configuration that will cooperate with and secure the position of a reader.

Figure 4:
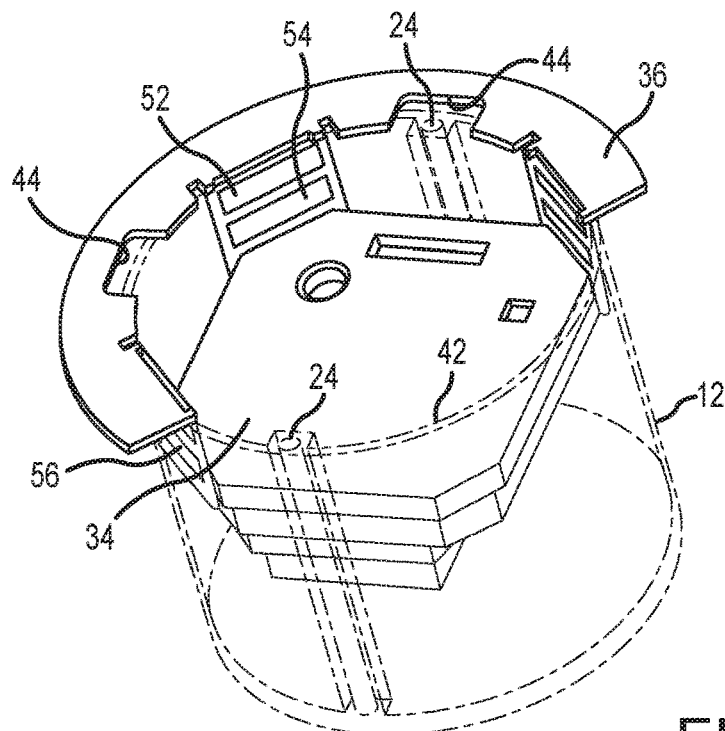
FIG. 4 is a top perspective view of an assembled electric junction box, universal mounting ring and reader shown in FIG. 3A, with the junction box shown in phantom.
Figure 5:
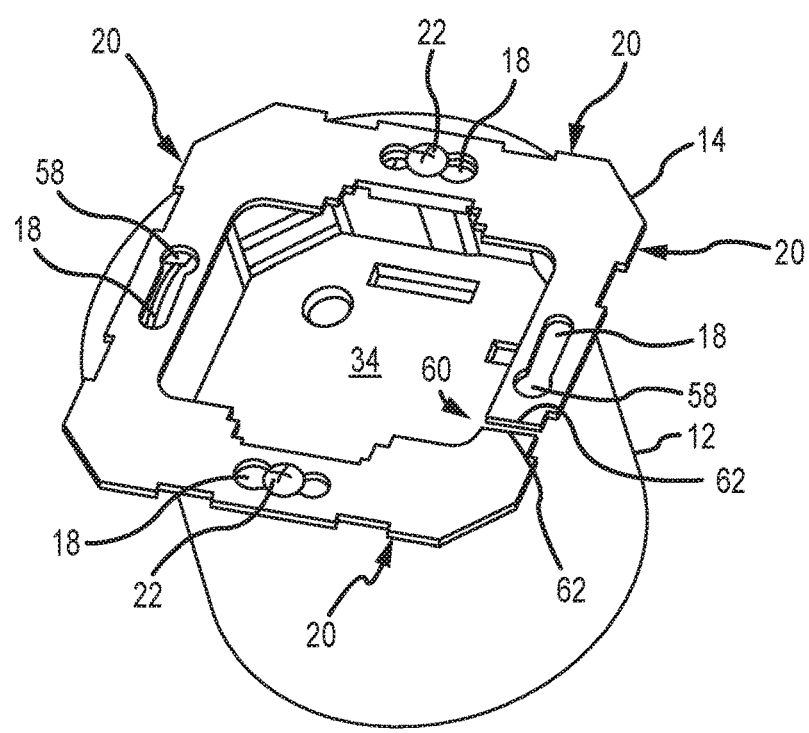
FIG. 5 is a top perspective view of an assembled junction box, reader, universal mounting ring and mounting bracket as shown in FIG. 3A.

As shown in FIGS. 3A and 3B, the arcuate plate 36 and reader 34 may be assembled in a conventional junction box 12. The arcuate plate 36 is adapted to accommodate and interface with a square mounting bracket 14. As shown in FIG. 4, a reader 34 is secured to the arcuate plate 36 and the arcuate plate 36 and reader 34 are positioned in the junction box 12. The arcuate plate 36 is oriented with the cutouts 44 to provide access to the screw bores 24 of the junction box 12. A mounting bracket 14 is then positioned over the arcuate plate 36 and secured to the junction box 12. More particularly, as shown in FIG. 5, two screws 22 pass through slots 18 to engage the screw bore 24 in the side wall of an electrical junction box 12. In the embodiment illustrated, the slots 18 are shaped with an enlarged end 58 to receive the head of a screw. The mounting bracket is then rotated such that the screw head is positioned within the narrow portion of the slot 18 and the screw is tightened. Securing the mounting bracket 14 to the junction box 12 simultaneously secures the arcuate plate 36 relative to the junction box 12.

The reader 34 cover assembly 16 is secured directly to the mounting bracket 14 by means known to those of skill in the art. As a result of the use of a universal mounting ring 32, the reader 34 cover assembly 16 may be mounted flush with the surface of the wall to provide a pleasing aesthetic look.

As can further be seen in FIG. 5, in at least one embodiment, one leg or side 20 of the mounting bracket 14 is cut completely through to form a slot 60 in the mounting bracket. The purpose of the slot 60 is to prevent the mounting bracket 14 from forming a continuous loop of metal. In addition, the slot 60 should be oriented such that it is not positioned on top of the arcuate plate 36. The slot 60 should be oriented in an open area with no other component or piece of metal interconnecting the opposed edges 62 of the slot. Forming a slot 60 completely through one side 20 substantially reduces interference with the reader antenna and read range of the reader is improved.

Figure 8:
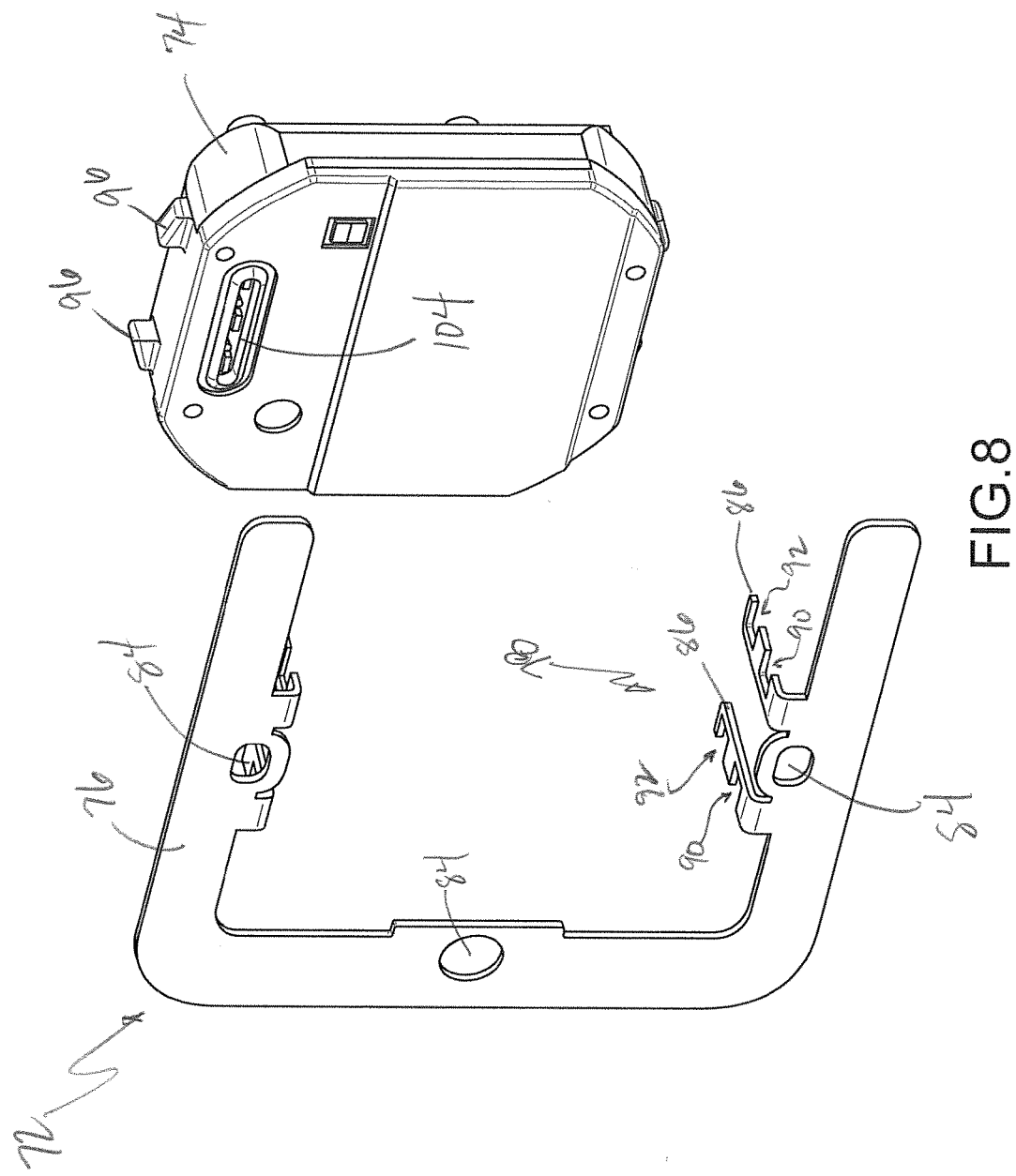
FIG. 8 is an exploded front perspective view of an alternative embodiment of a mounting bracket and electronic module.
Figure 9A:
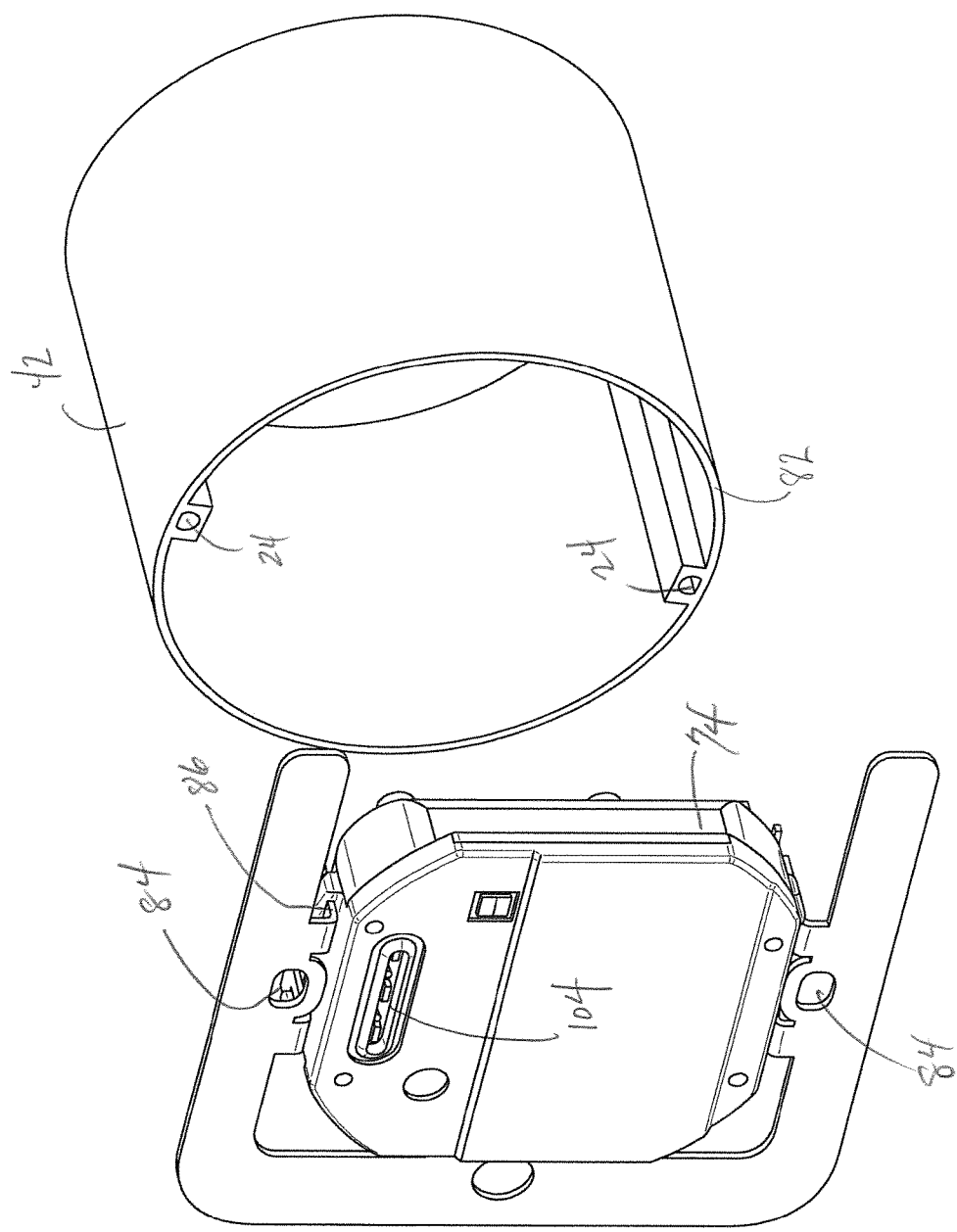
FIG. 9A is an exploded perspective view of the components shown in FIG. 8, as a subassembly, with an electrical junction box.
Figure 10:
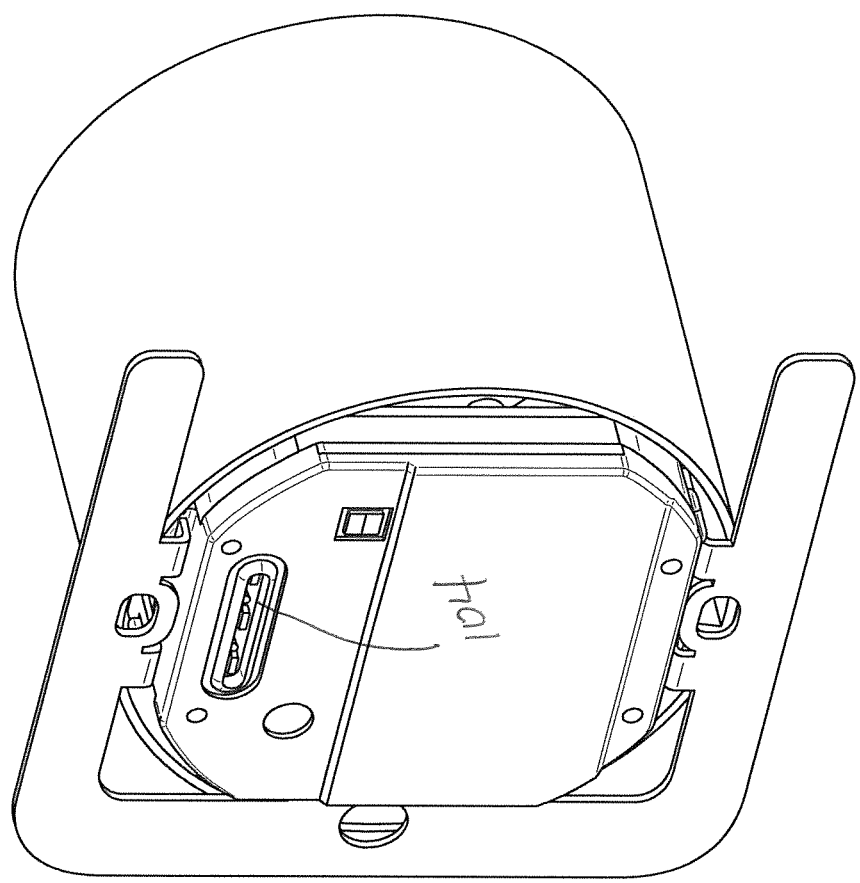
FIG. 10 is an exploded front perspective view of the component shown in FIG. 9A, as a subassembly.
Figure 12:
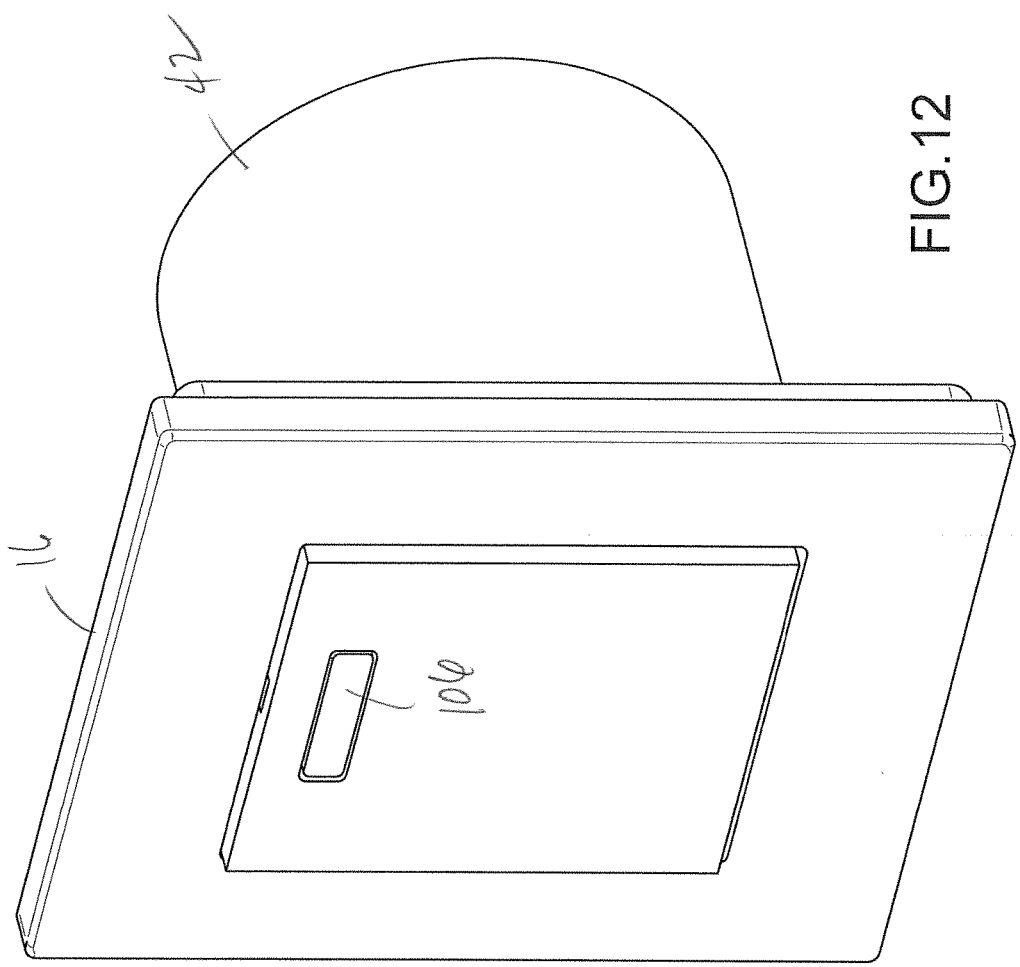
FIG. 12 is a front perspective view of the components shown in FIG. 11, assembled together.

FIGS. 8-14 illustrate an alternative embodiment within the scope of the present invention. A mounting ring 72 and electronic module 74 are shown. Here, the mounting ring 72 is more rectilinear in shape than the embodiment shown in FIG. 2B, for example. As depicted, the mounting ring 72 has a U-shaped or C-shaped plate 76 with downwardly depending or extending mounting tabs 78. The lower surface 80 of the plate 76 abuts the upper edge 82 of the junction box 42, as seen in FIGS. 9A, 9B and 10. Cut outs 84 are formed in the plate 76 to permit screws 22 to secure the plate 76 to the junction box 42 by way of screw bores 24 formed in the junction box 42. Other mounting schemes, such as snaps, adhesives, clips, pins, hook and loop fasteners, etc., may be used as an alternative to or for use in combination with the screws 22. As shown in FIGS. 11 and 12, a cover assembly 16 connects directly to the mounting ring 72 or a mounting bracket (not shown) may be positioned between the mounting ring 72 and cover assembly 16 to facilitate the interconnection.

As shown in FIGS. 8, 9B, 13A and 13B, the mounting tabs 78 in this embodiment comprise legs 86. The legs 86 are independent in this embodiment, compared to the interconnected legs 46 in the prior embodiments. As shown, each leg 86 includes two notches 90 and 92. FIG. 13A shows the electronic device 74 positioned in the notches 90, closest to the plate 76. FIG. 13B shows the electronic device 74 positioned in the notches 92, farther from the plate 76. More particularly, the notches 90 and 92 in each pair of legs 86 are oriented such that the openings 94 face away from or opposite of the opening in the associated other notch. As shown in FIG. 8, a pair of extensions 96 are formed in the body of the electronic device 74 which are designed to fit in and engage the notches. In this embodiment, the pairs of extensions 96 are formed on opposite sides of the electronic device 74, but could be formed at different locations on the body of the electronic device 74. The extensions 96 connect to the notches 90 and 92 by friction or snap fit. For example, as shown in FIG. 9B, the notches 90 and 92 and the extensions 96 have a generally rectilinear shape such that the extensions 96 fit securely in each notch. The outer surfaces 98 of the extensions preferably abut the inner surfaces 100 of the notches to secure the electronic device 74 in place. It should be appreciated that the shape of the notch and extension need not be rectilinear, but could be any other shape that would facilitate a friction or snap fit connection, for example an arcuate or polygon shape.

Figure 16A:
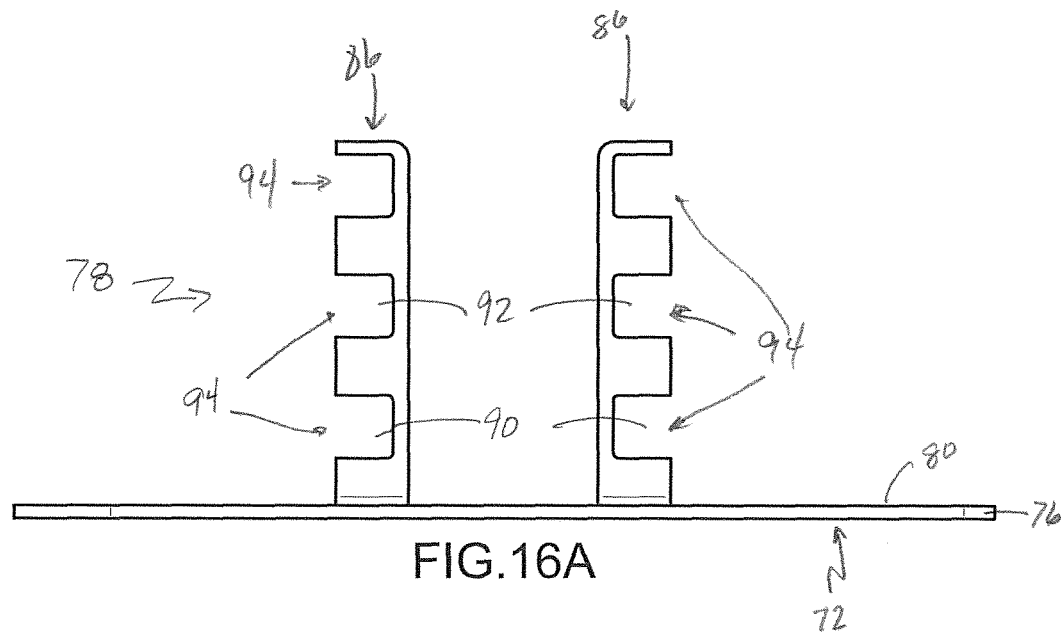
FIG. 16A is a side elevation view of an alternative embodiment of the universal mounting ring.
Figure 16B:
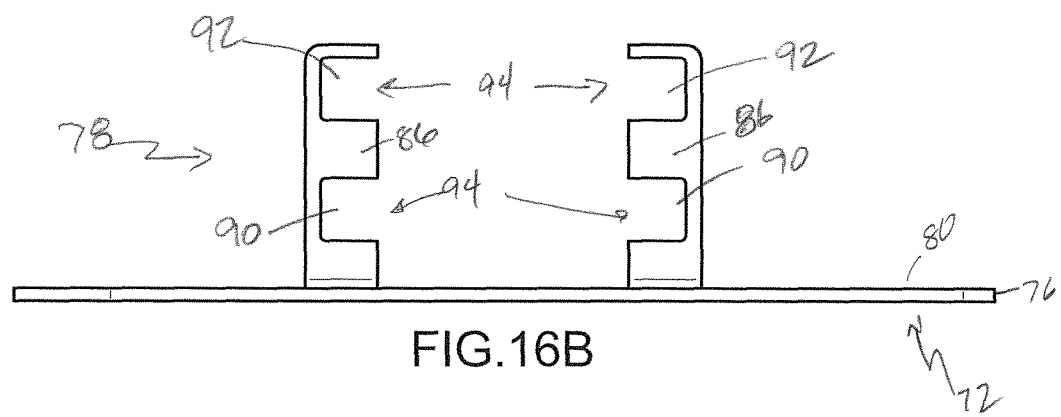
FIG. 16B is a side elevation view of an alternative embodiment of the universal mounting ring.
Figure 16C:
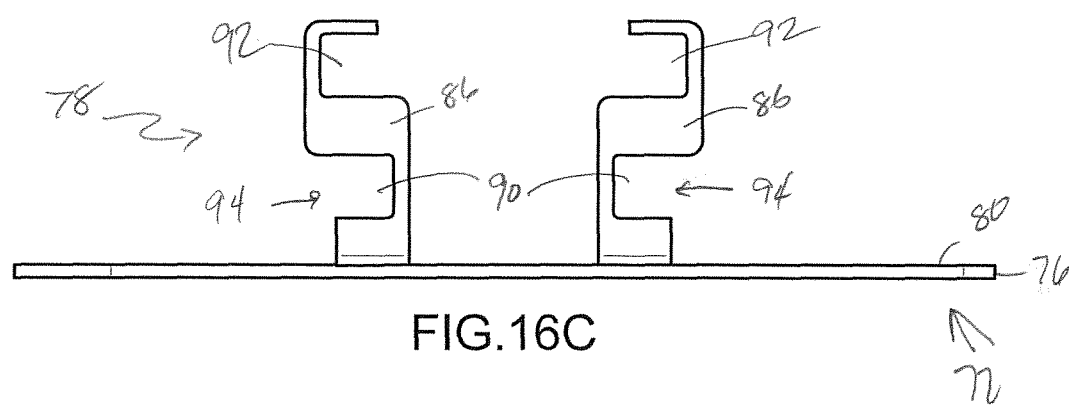
FIG. 16C is a side elevation view of an alternative embodiment of the universal mounting ring.

Additional pairs of notches, positioned along the length of the legs 86, such as shown in FIG. 16A, may be added. As a result, the electronic device 74 may be positioned farther from the plate 76. Further still, additional configurations could also be utilized. For example, the open side 102 of the notches 90 and 92 could face toward each other, as shown in FIG. 16B, rather than away from each other as shown in FIGS. 13A and B. Alternatively, the direction of the notches may face in the opposite directions, such as shown in FIG. 16C. In the embodiments of FIGS. 16A-16C, it is important that the corresponding notches on each leg within in each pair of legs have the respective openings face either toward or away from each other.

As shown in FIG. 11, the electronic device may optionally include a connector 104 to interconnect with an electronic display 106 in the cover assembly 16. A wide variety of information may be conveyed via the display, including but not limited to, information related to access that could inform or assist a user, and information that assists a technician for installation, maintenance and upgrade.

FIGS. 9A and 9B show the electronic device 74 connected to the universal mounting ring 72, and positioned to be connected to a junction box 42. FIG. 10 illustrates the electronic device 74, mounting ring 72 and junction box 42 interconnected. As further shown, the connector 104 is positioned to interconnect with a complimentary connector (not shown) mounted in the cover assembly 16. FIG. 11 illustrates a cover assembly 16 positioned to interconnect to the mounting ring 72 and electronic device 74. An electronic display 106 is shown on the face of the cover assembly 16 and is available to display information from the electronic module 74. FIG. 12 illustrates an electrical assembly comprising a cover assembly 16, interconnected to an electronic device 72 and mounting ring 72, which are, in turn, interconnected to a junction box 42.

Figure 14A:
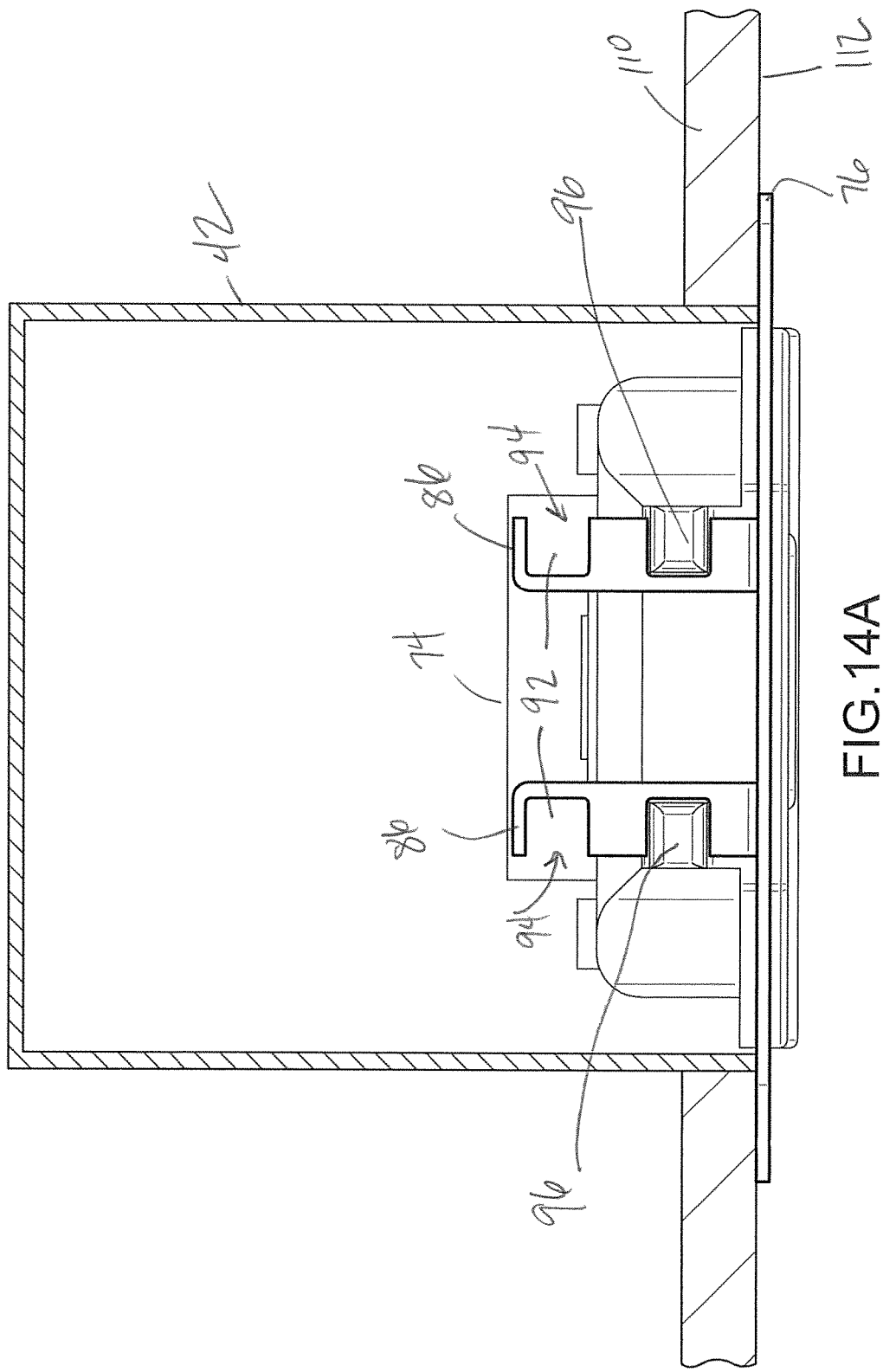
FIG. 14A is a top plan view of the embodiment shown in FIG. 13A, mounted within a wall.
Figure 14B:
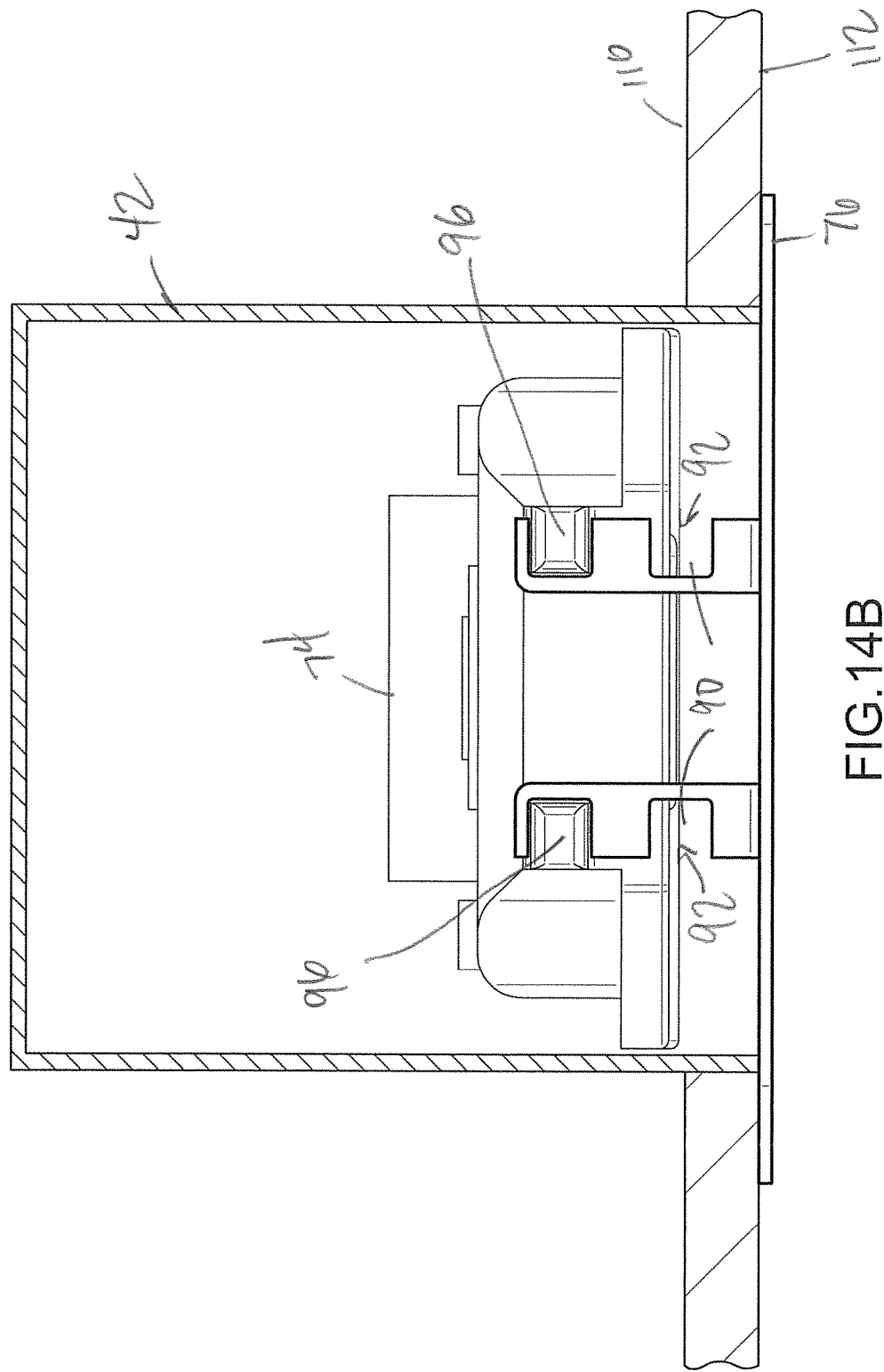
FIG. 14B is a top plan view of the embodiment shown in FIG. 13B, mounted within a wall.
Figure 15A:
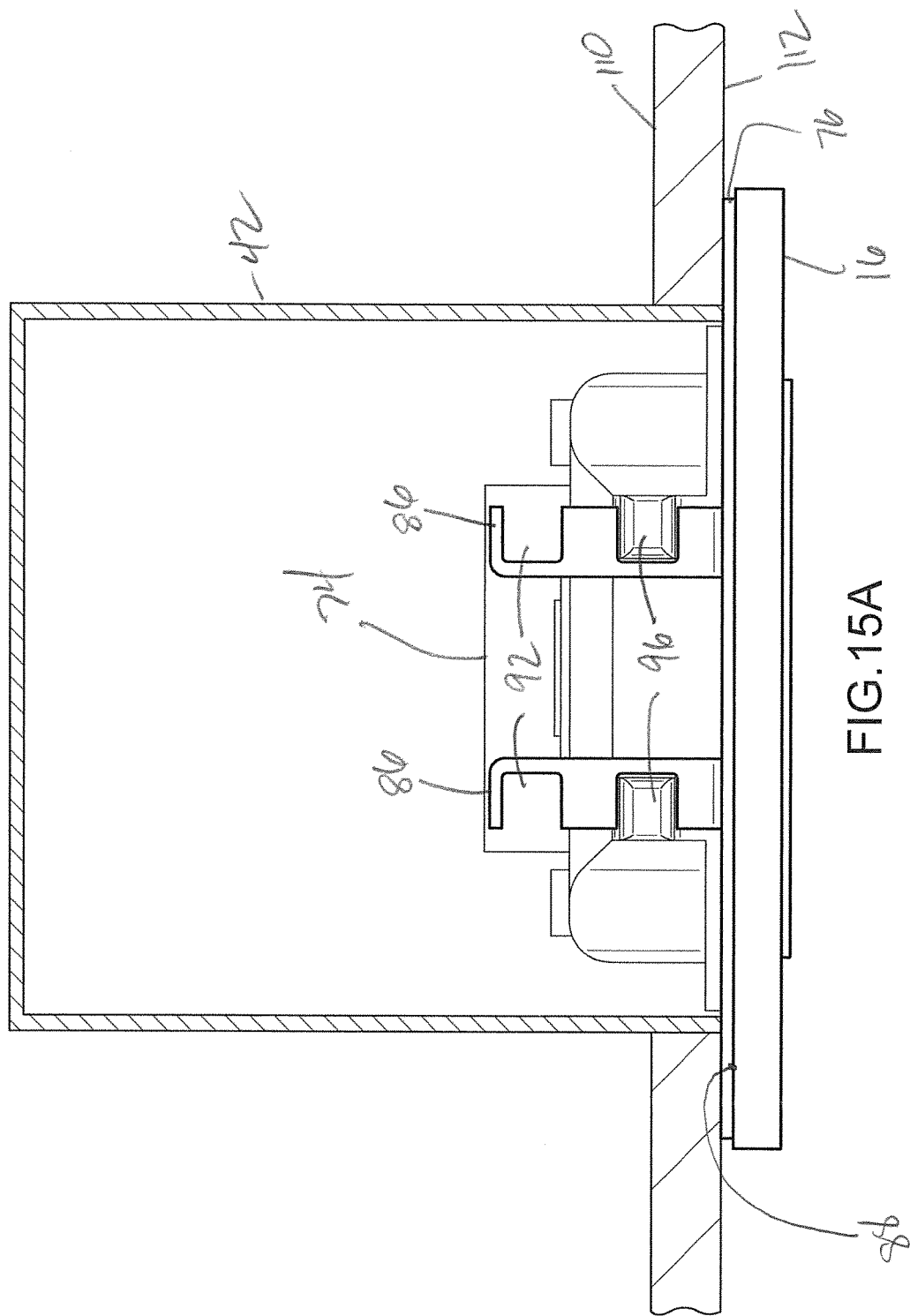
FIG. 15A is a top plan view of the embodiment shown in FIG. 14A, with a cover assembly.
Figure 15B:
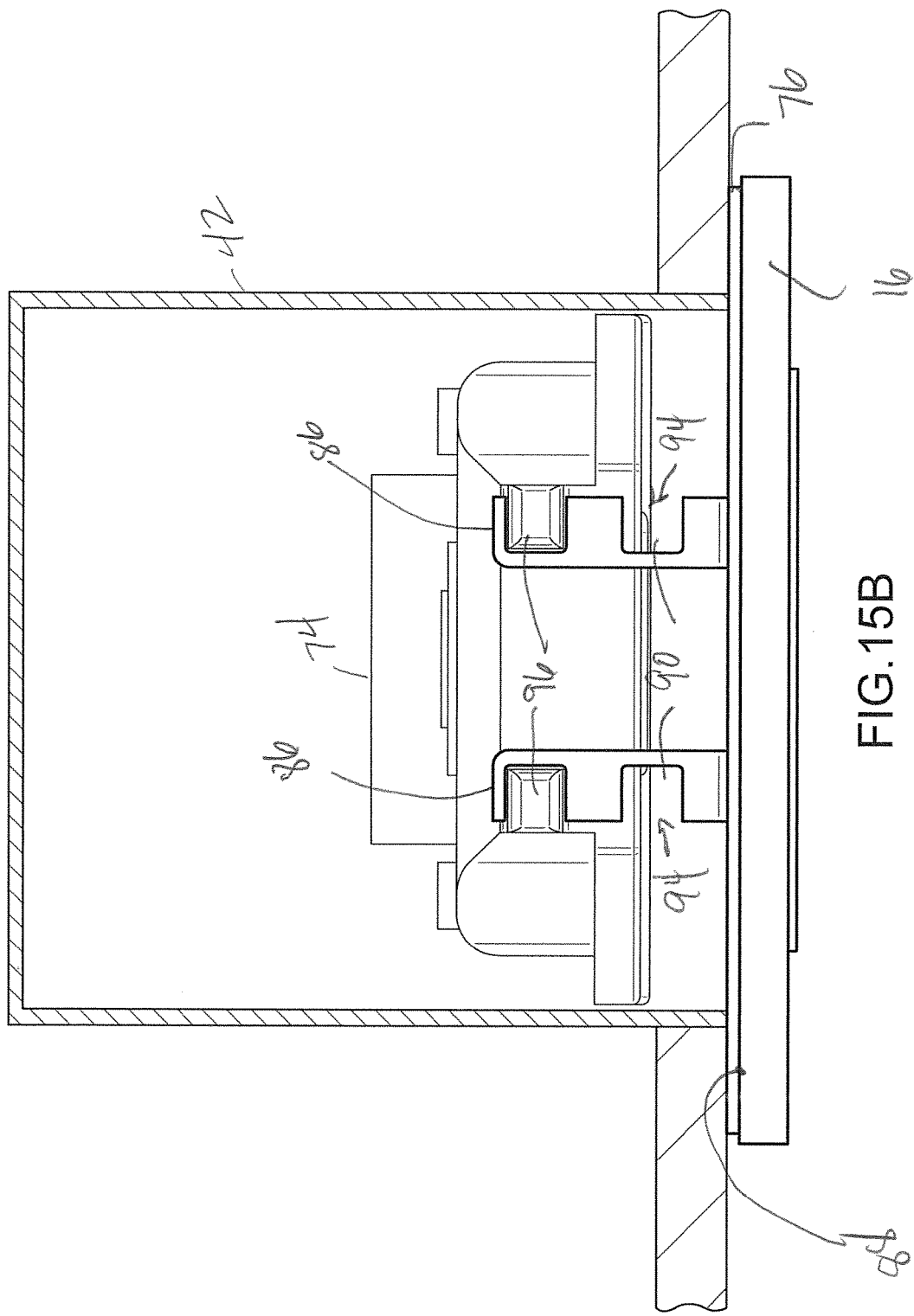
FIG. 15B is a top plan view of the embodiment shown in FIG. 14B, with a cover assembly.

FIGS. 14A and 14B illustrate two specific installations of an embodiment of the present invention. In FIG. 14A, an electronic enclosure 108 is shown comprising a junction box 12, an electronic device or module 74, a mounting ring 72 and a cover assembly 16. The junction box 12 is mounted relative to a wall 110 such that the electronic device 74 is fully recessed relative to the outer or exposed surface 112 of the wall 110. FIG. 14A illustrates an installation where the electronic device 74 is secured in notches 90, which define a first mounting position with the electronic device 74 extending partially out of the junction box 42. FIG. 14 B illustrates an installation where the electronic device 74 is secured in notches 92, which define a second mounting position with the electronic device 74 positioned fully inside the junction box 42. In both instances, the under surface 80 of the universal mounting plate 76 abuts the exterior surface 112 of the wall 110. FIGS. 15A and 15B correspond to FIGS.

14A and 14B, respectively, except that cover assembly 16 is added. It should be appreciated that the cover assembly 16 may be sized to fit completely over the universal mounting plate 76 such that the inner side 88 of the cover assembly 16 abuts the exterior surface 112 of the exterior wall. According to other aspects of the present disclosure, the cover assembly 16 may be mounted to the mounting plate 76 such that the exterior surface 120 of the cover assembly 16 is flush with the exterior surface 112 of the exterior wall. Further still, the aesthetics of the cover assembly 16 may replicate that of the surrounding wall such that that cover assembly is effectively hidden or camouflaged. It should further be appreciated that the position of the notches 90 and 92 relative to the legs 86 may vary, as well as the relative spacing between the notches 90 and 92 on the leg 86. The notches may be closer and/or farther from the plate 76 and may be spaced closer together and/or farther apart, uniformly or non-uniformly. For example, the size and type of electronic device that will be utilized can influence the spacing of the legs 86 relative to each other, the location of the legs 86 relative to the plate 76, and the spacing of the notches relative to each other. Unlike the embodiments of the present invention, conventional RFID reader assemblies are typically mounted to the exterior of a wall, rather than recessed within a wall. As a result, the entirety of the reader assembly, including the electronic module, reader housing and cover assembly are positioned exterior to the wall and have a relatively obtrusive profile. For example, the inner side of the cover plate 114 may be positioned in contact with the exterior surface 112 of the wall 110. The designs encompassed by the present invention permit the electronic device to be recessed within a wall, thereby offering greater flexibility to engineers and designers for designing cover assemblies and improving functional performance or user benefit. FIGS. 1, 12, and 15A and 15B illustrate a relatively thin cover assembly 16. One benefit is to design less obtrusive cover assemblies and/or cover assemblies that match other hardware within the same physical space or even blend into the wall so as to be obscure. The latter allows for covert knowledge of the actual reader location and access benefits thereof. A flush or nearly flush mounted reader reduces the chances of non-intended environmental exposure, such as flame, chemical, dust or water. Additionally, a flush or nearly flush mounted reader can reduce malicious attacks or damage where physical leverage is used to attempt to pry the reader from the enclosure. While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Other modifications or uses for the present invention will also occur to those of skill in the art after reading the present disclosure. Such modifications or uses are deemed to be within the scope of the present invention.

What is claimed is:

1. A method of using a universal mounting ring, comprising:
   a. providing a universal mounting ring comprising:
      i. a planar U-shaped plate having a width, an outer perimeter edge and an inner perimeter edge; and
      ii. at least one mounting tab comprising two parallel legs extending perpendicular to the U-shaped plate, a plurality of open-sided notches formed in each leg defining a plurality of mounting positions for receiving an electronic device and wherein each mounting position is located a different distance from the U-shaped plate;
   b. securing an electronic device to at least one mounting tab of the universal mounting ring;
   c. positioning the universal mounting ring and electronic device in an electrical enclosure, wherein the electrical enclosure is positioned at least partially inside a wall, and wherein the wall has an exterior surface; and
   d. positioning a cover assembly over the universal mounting ring, the cover assembly having a first exterior surface facing away from the universal mounting ring and a second exterior surface facing toward the universal mounting ring, wherein the second exterior surface of the cover assembly abuts the exterior surface of the wall and the electronic device is positioned inside the wall.

2. The method of claim 1, comprising:
   providing a mounting bracket secured to the universal mounting ring; and
   attaching the cover assembly to the mounting bracket with the second exterior surface of the cover assembly flush with the exterior surface of the wall.

3. The method of claim 1 comprising, adjusting the performance of the electronic device by repositioning the electronic device relative to the at least one mounting tab.

4. The method of claim 1 wherein the enclosure is a cylindrical junction box.

5. The method of claim 1 wherein the enclosure is rectilinear in shape.

6. The method of claim 1 wherein the electronic device is one of a contact reader, a contactless reader, a miniature controller and a door interface module.

7. The method of claim 1, wherein the electronic device is positioned inside the electrical enclosure.

8. The method of claim 1, wherein the step of positioning a cover assembly over the universal mounting ring comprises positioning the cover assembly in an abutting relation with the universal mounting ring.

9. The method of claim 1, wherein the step of positioning a cover assembly over the universal mounting ring comprises positioning the universal mounting ring between the exterior surface of the wall and the cover assembly.

* * * * *